United States Patent [19]

Wendel

[11] 4,438,615
[45] Mar. 27, 1984

[54] ORBA-HUB
[75] Inventor: Wendel R. Wendel, Plainview, N.Y.
[73] Assignee: Space Structures International Corp., Plainview, N.Y.
[21] Appl. No.: 325,801
[22] Filed: Nov. 30, 1981
[51] Int. Cl.³ .......................... F04H 12/06; F16B 7/18
[52] U.S. Cl. ..................................... 52/648; 403/171; 403/176
[58] Field of Search ............................ 52/648, 80, 81; 403/171, 172, 176

[56] References Cited
U.S. PATENT DOCUMENTS

| | | | |
|---|---|---|---|
| 3,921,360 | 11/1975 | Baldwin | 52/648 |
| 3,995,962 | 12/1976 | Mylaeus | 403/171 |
| 4,027,449 | 6/1977 | Cilveti | 403/171 |
| 4,313,687 | 2/1982 | Apeytegui et al. | 403/171 |

FOREIGN PATENT DOCUMENTS

| | | | |
|---|---|---|---|
| 410185 | 3/1945 | Italy | 403/171 |
| 352814 | 4/1961 | Switzerland | 403/176 |

Primary Examiner—John E. Murtagh
Assistant Examiner—Michael Safavi
Attorney, Agent, or Firm—Kane, Dalsimer, Kane, Sullivan & Kurucz

[57] ABSTRACT

A hub for use in a space frame assembly which can be joined to a like hub by a strut member by bolt means connecting the strut to the hub in a preset spacing and in which the bolt means includes spherical bearing surfaces for positioning and a column member surrounding each bolt means to provide a compression load transfer path.

6 Claims, 11 Drawing Figures

ORBA-HUB

BACKGROUND OF THE INVENTION

Structural configurations known as space frames wherein strut members are joined at ends in three dimensional arrays are well known in the art. It is known in the art to utilize a hub and multiple strut system such as that shown in U.S. Pat. No. 3,161,088 to Gugliotta.

Use of prior art systems employing such spherical hub connection devices however has been restricted due to various limitations inherent in such systems. The requirement that the struts be provided in precise length and that the joining be at a small sphere has limited assembly. Also since in many cases all structural members are visible after construction, the designer is limited by the esthetic considerations in selecting components in a structure to accomodate various axial loads. For example bolt thickness in a system need not be the same in all positions for strength considerations but to have bolts of differing outside diameters in adjacent positions may be visually undesirable.

SUMMARY OF THE INVENTION

In the subject invention the connection system is composed of a round, solid spherical hub and a round tube strut with tapered ends. Round cylindrical strut members of similar external diameter and varying wall thickness are utilized to create architectural simplicity and uniformity with the required structural integrity. The system allows for multiple strut members to fill any spaceframe geometry design requirements and includes a collar clip-on detail that results in smooth lines for strong architectural appeal.

DESCRIPTION OF THE PREFERRED EMBODIMENT

Figure 3:
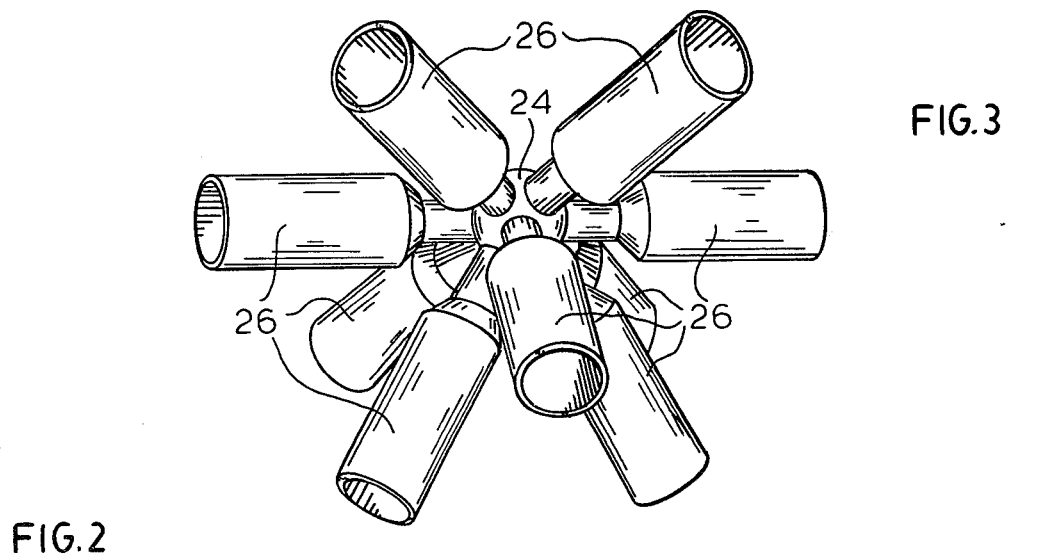
FIG. 3 is segmentary perspective view of the hub connection member of this invention with multiple strut members engaged therewith.
Figure 2:
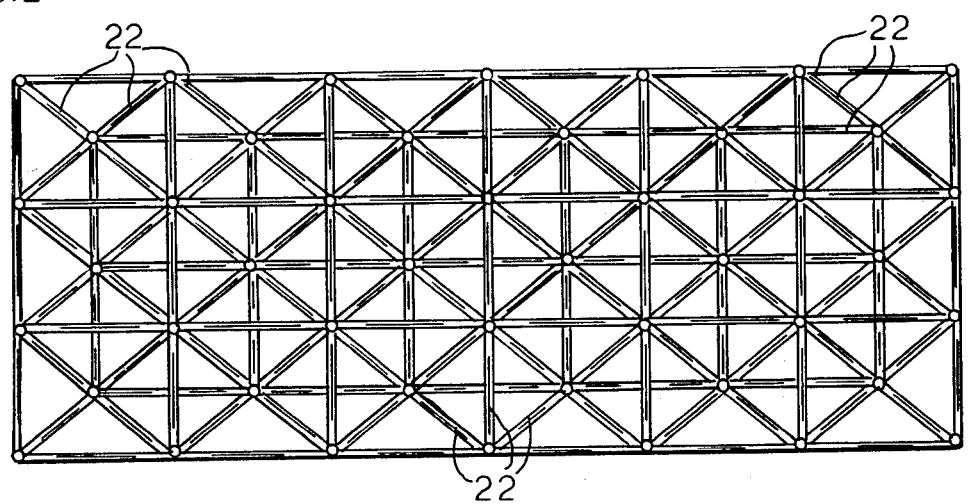
FIG. 2 is a top plan view of such a structure as that shown in FIG. 1.
Figure 1:
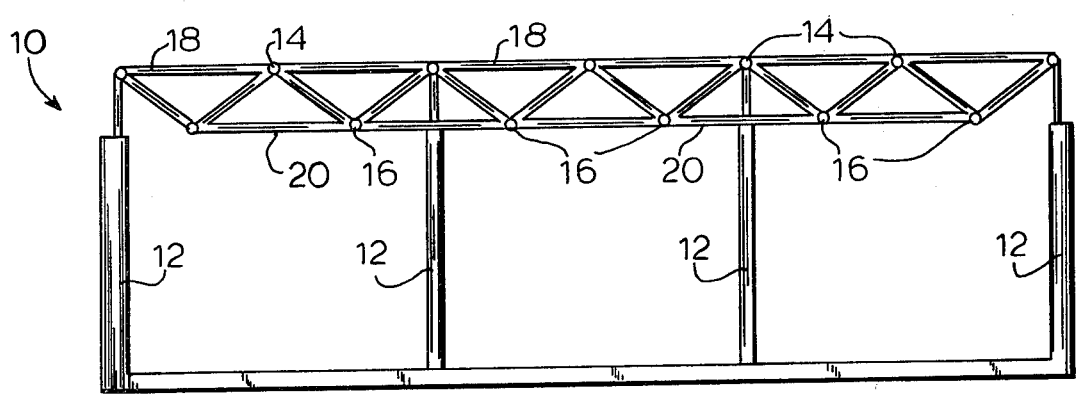
FIG. 1 is an elevation of a typical space frame structure utilizing a spherical hub connection member.

In FIG. 1 a typical space frame structure is shown in the form of a double grid system 10 supported on columns 12. Upper and lower transverse struts are indicated by the numerals 14 and 16 respectively while the upper and lower lengthwise struts are respectively indicated by the numerals 18 and 20. The upper struts are connected to the lower struts by web members 22 as seen in FIG. 2 and all struts are connected at ends by the hub connection system of this invention which is illustrated in FIG. 3 and indicated by the numeral 24 wherein all struts and webs connected thereto are indicated generally by the numeral 26.

Figure 4:
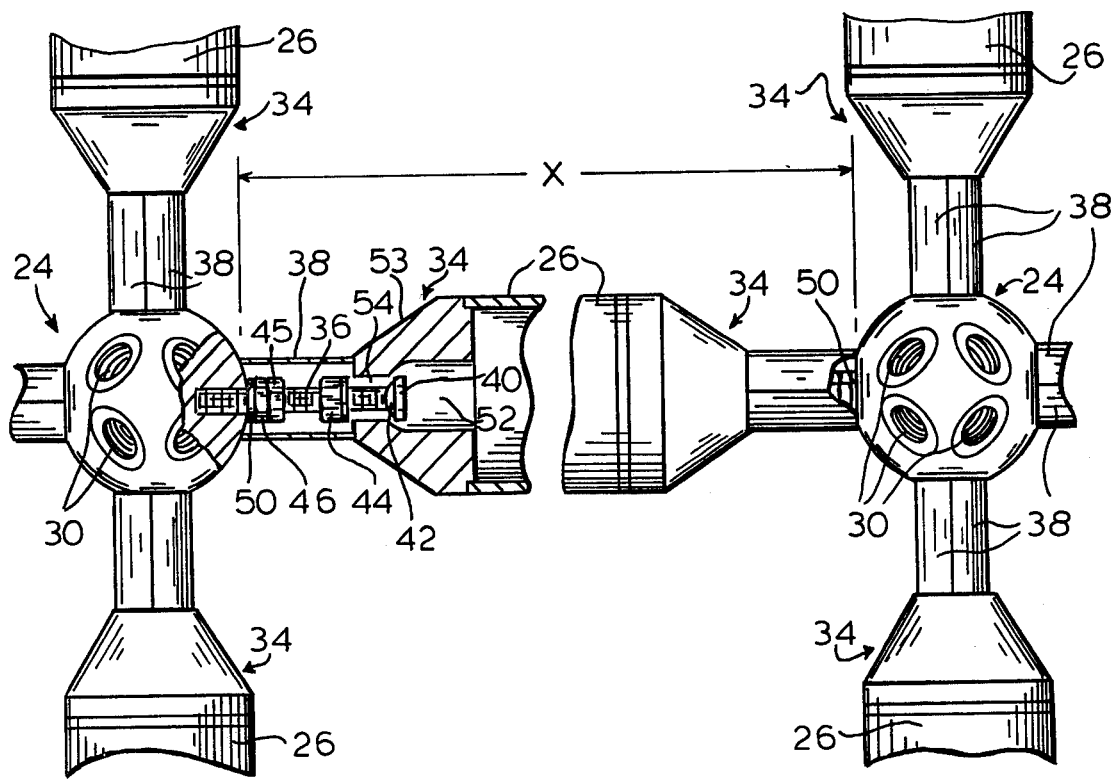
FIG. 4 is an enlarged view of a strut connected at ends to two hub connection systems in accordance with this invention with portions cut away.
Figure 6A:
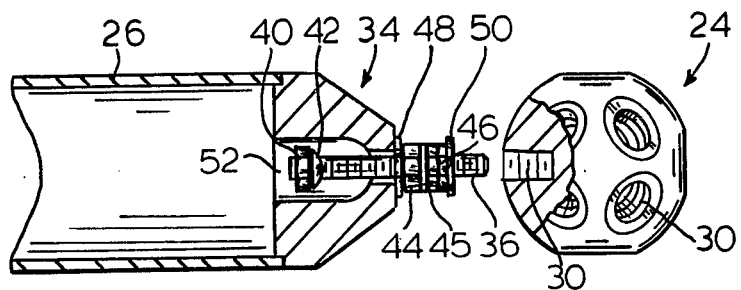
FIGS. 6A through 6D are segmentary views of the hub connection system of this invention illustrating the method of attachment of a strut end thereto.
Figure 6B:
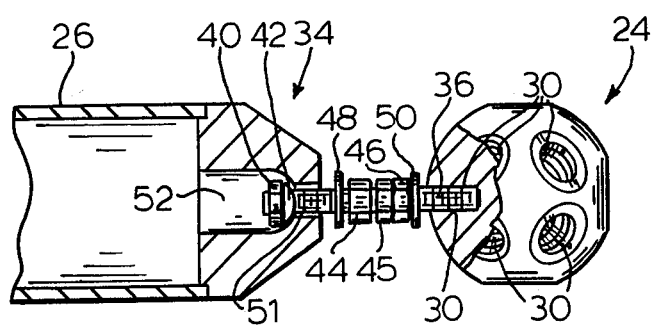
Figure 6C:
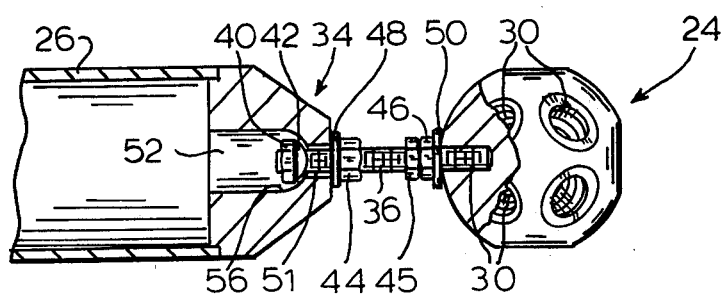
Figure 6D:
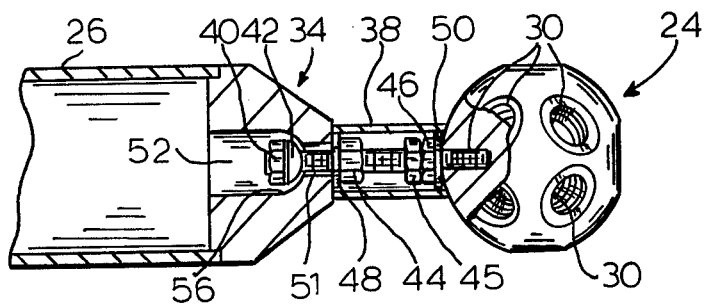

A typical strut 26 is shown in FIG. 4 connected at ends to two hub connection members 24. Each hub connection system as seen in FIGS. 4 and 5 includes as major components a solid sphere hub 24 with threaded holes 30 at flattened surface areas 32, an end plug 34, a bolt 36 with associated connectors and a two section collar clip 38.

As stated above, the ball 24 is a solid sphere with flattened surfaces 32 with threaded holes 30 opening at these surfaces. The holes are designed to receive the threaded end of bolt 36. The bolt system as shown includes the bolt 36 having head 40, bearing washer 42 jamb nuts 44 and 45 and nut 46 and washers 48 and 50.

The end plug 34 has a conical outer face 53 and a two diameter cylindrical inner bore. Bore section 52 is greater than bore opening 54. These sections are joined by concave surface 56. Annular recess 58 is provided at the larger diameter end of the end plug for receipt of the end of strut 26 which is attached thereto by suitable means such as welding.

Figure 5:
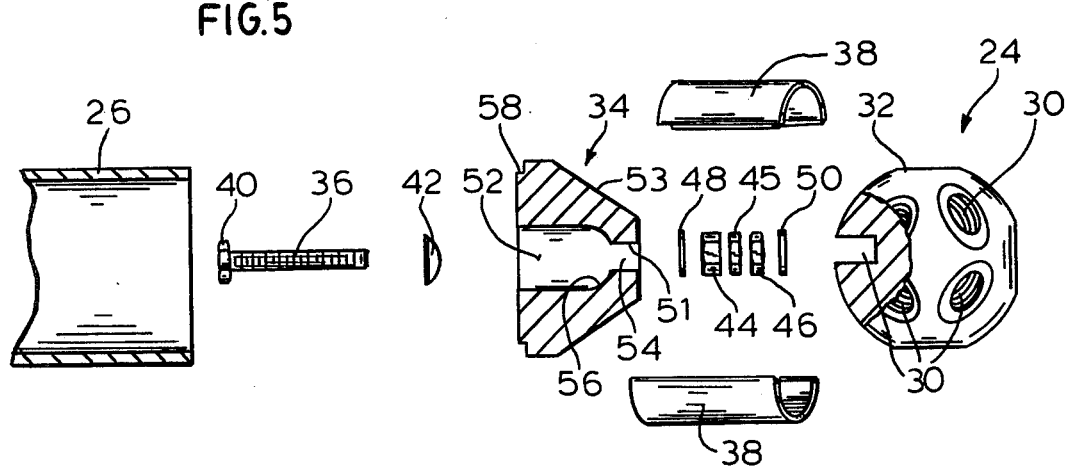
FIG. 5 is an exploded view of a hub connection system constructed in accordance with the teachings of this invention again with portions cut away.

In order to appreciate the assembly of the subject system it is noted that the components as shown in FIG. 5 are preassembled and distance X between washers 50 and 50 as indicated in FIG. 4 is determined in the shop prior to shipment.

First the bolt 36 is extended from the strut 26 through bores 52 and 54 of cone 34 and the threaded end thereof engaged with the threads of hole 30 of the spherical hub 24. The washer 50 is then butted against the adjacent flattened surface 32 of spherical hub 24 and secured in that position by nuts 45 and 46, and thereafter nut 44 is backed off along bolt 36 to butt washer 48 against surface 51 of cone 34. The dimension is fixed by the established distance between the outer surfaces of washers 50 of a fully assembled strut as shown in FIG. 4. If desired after fixing the dimension X in the shop the strut assembly can be shipped without the spherical hub. The collar clip 38 is snapped into position thereafter.

As noted the jamb nut 45 maintains nut 46 in position insuring the integrity of the dimension X. If desired jamb nut 45 can be omitted and an allen screw or other suitable position fixing means be utilized.

In this assembly there are two load transfer paths in compression. One is through the collar 38 which is both decorative and structural and the other is through the bolt 36. In the case of the bolt the load is transferred from the strut to the end plug to nut 44 through the bolt and into the sphere. As to collar 38 the compressive load from the strut transfers through the end plug and collar to the hub.

Tension transfers from sphere through the threaded rod, through the bearing nut to the curved inner surface of the end plug to the strut.

There is no eccentric loading on the sphere.

Figure 8:
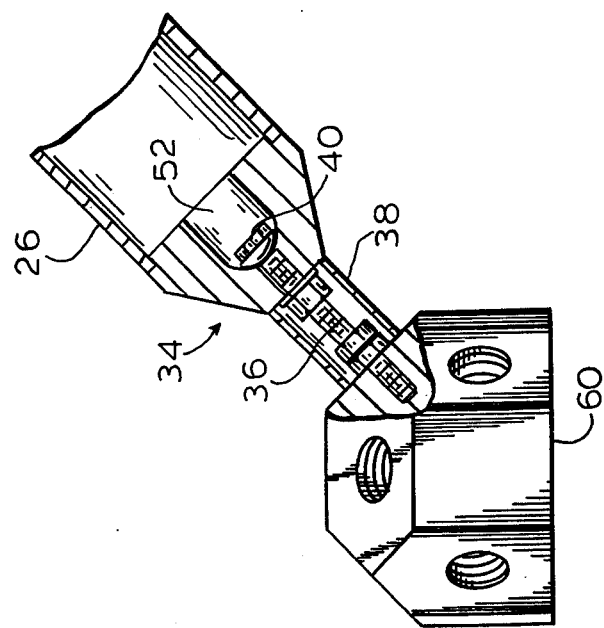
FIGS. 7 and 8 are views of an alternate form of the invention in which the views respectively are a top plan view and a segmentary view from the side with a strut engaged.
Figure 7:
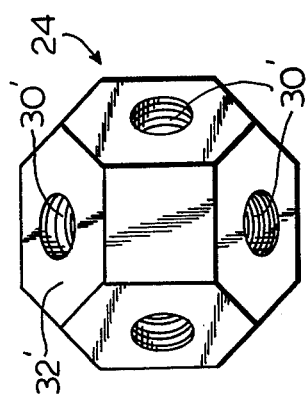

A further embodiment of the invention is shown in FIGS. 7 and 8 wherein the only difference from the system shown in FIGS. 1 through 6 is in that in the embodiment of FIGS. 7 and 8 a non spherical solid hub 24' is shown having flat surfaces 32' surrounding threaded holes 30' and a major flattened surface 60. The remaining parts of the assembly are the same and given in FIGS. 7 and 8 the same identifying nunerals as in FIGS. 1 through 6.

The present system has many advantages over the prior art. The strut length can be determined by the bolt location and not by cut length and the outside diameter of all struts can remain the same while having different wall thicknesses to accomodate various loads. The highest strength bolts are not required in all positions while architecturally each piece can be made to appear the same from the outside while changing strength to accomodate different load conditions.

The use of a round hub and tapered end plugs enables the bringing of all struts together at one hub. The system allows for maximum structural material in the sphere and the holes for strut attachment can be located at any point on the surface of the hub. The spherical hub can resist high compression and tension loads—sometimes in opposite directions at the same time.

The building can be assembled in different ways—one piece at a time, in sub-assembly section or as one whole unit to be lifted into place, or as the screw assembly is made it adjusts to the spherical surface of the plug. The use of round spherical washers eases installations and allows for full bearing capabilities under tension load. The strut and end plug can be joined with rivets, screws, welding, or other means as desired.

The subject invention provides a system which is versatile, easy to assemble, relatively inexpensive and decorative.

I claim:

1. A strut assembly for joining first and second hubs in a space frame including in combination a strut member, first and second bolt means projecting from said strut member, first and second bore sections of said strut member, first and second bore openings of lesser diameter than said bolt means communicating respectively with said first and second bore sections, first conical shoulder means joining said first bore opening and said first bore sections, second conical shoulder means joining said second bore opening and said second bore section, said first and second bolt means respectively projecting in loose fit configuration through said respective bore openings and into respective bore sections, a spherical bearing surfaced nut on the end of each of said bolt means within each said respective bore section engaging said respective conical shoulder, first and second hub abutting means fixed in position on said first and second bolt means respectively providing a known preset spacing therebetween and in which a respective cylindrical collar member surrounding respective bolt means with ends thereof respectively abutting said strut member and a respective hub to provide a compressive load transfer path.

2. A strut assembly in accordance with claim 1 in which said first and second hub abutting means are movable longitudinally respectively of said first and second bolt means and first and second moving means operatively associated respectively therewith.

3. A strut assembly in accordance with claim 1 in which first and second positioning means are respectively operatively associated with said first and second bolt means for fixing the position thereof with respect to said strut.

4. A strut assembly in accordance with claim 3 in which said strut has compression resisting surfaces against which said first and second respective positioning means abut.

5. A strut assembly in accordance with claim 4 in which said hub has a hub compression resisting surface against which said hub abutting means abuts.

6. A strut assembly in accordance with claim 5 in which a collar surrounds said bolt means with one end thereof abutting said cone compression resisting surface and the remaining end thereof abutting said hub compression resisting surface.

* * * * *